(12) United States Patent
    Mamigonians

(10) Patent No.: US 9,016,143 B2
(45) Date of Patent: Apr. 28, 2015

(54) SENSOR ARRAY FOR SENSING THE MAGNITUDE AND POSITION OF A FORCE

(75) Inventor: Hrand Mami Mamigonians, London (GB)

(73) Assignee: HM Technology International Limited, Harrow, Middlesex (GB)

( * ) Notice: Subject to any disclaimer, the term of this patent is extended or adjusted under 35 U.S.C. 154(b) by 350 days.

(21) Appl. No.: 13/410,711

(22) Filed: Mar. 2, 2012

(65) Prior Publication Data

US 2012/0222496 A1    Sep. 6, 2012

(30) Foreign Application Priority Data

Mar. 4, 2011  (GB) .................................. 1103759.5
Jul. 4, 2011  (GB) .................................. 1111403.0

(51) Int. Cl.
    *G01L 1/00*     (2006.01)
    *G01R 27/28*    (2006.01)
    *G01L 1/14*     (2006.01)
    *G01L 5/16*     (2006.01)
    *B60N 2/00*     (2006.01)

(52) U.S. Cl.
    CPC .................. *G01L 1/142* (2013.01); *G01L 1/146* (2013.01); *G01L 5/165* (2013.01); *B60N 2/002* (2013.01)

(58) Field of Classification Search
    CPC .......... G01L 1/142; G01L 1/146; G01L 5/165
    USPC ......... 73/862.626, 862.628, 862.68; 324/649; 345/174
    See application file for complete search history.

(56) References Cited

U.S. PATENT DOCUMENTS

| | | | | |
|---|---|---|---|---|
| 5,373,245 A | * | 12/1994 | Vranish | 324/662 |
| 2006/0012944 A1 | * | 1/2006 | Mamigonians | 361/303 |
| 2006/0119369 A1 | * | 6/2006 | Kawahata et al. | 324/662 |
| 2008/0173105 A1 | * | 7/2008 | Wang et al. | 73/862.626 |
| 2009/0158856 A1 | * | 6/2009 | Harish et al. | 73/780 |
| 2010/0024573 A1 | * | 2/2010 | Daverman et al. | 73/862.626 |
| 2010/0253645 A1 | * | 10/2010 | Bolender | 345/174 |
| 2010/0295814 A1 | * | 11/2010 | Kent et al. | 345/174 |
| 2012/0162094 A1 | * | 6/2012 | Kent et al. | 345/173 |
| 2012/0162123 A1 | * | 6/2012 | Kent et al. | 345/174 |

FOREIGN PATENT DOCUMENTS

EP    1653206 A2    5/2006
KR    1020100044384    4/2010

OTHER PUBLICATIONS

Cui, Z. et al, Image reconstruction for field-focusing capacitance imaging, Meas. Sci. Technol, 22 (2011), 035501 (9 pp).
Chen et al, Image reconstruction for an electrical capacitance tomography system based on a least-squares support vector machine and a self-adaptive particle swarm optimization algorithm, 2011.

* cited by examiner

*Primary Examiner* — Hezron E Williams
*Assistant Examiner* — David Z Huang
(74) *Attorney, Agent, or Firm* — Arthur Jacob

(57) ABSTRACT

A sensor array for sensing the magnitude and position of a force in a first direction is provided. The sensor array includes a compressible layer, an electrically grounded layer, and an electrically active layer comprising a plurality of transmitter electrodes and a plurality of receiver electrodes. Each of the transmitter electrodes is configured to capacitively couple to a receiver electrode, and the compressible layer is positioned between the electrically grounded layer the electrically active layer.

18 Claims, 19 Drawing Sheets

SENSOR ARRAY FOR SENSING THE MAGNITUDE AND POSITION OF A FORCE

CROSS REFERENCE TO RELATED APPLICATIONS

This application claims priority from United Kingdom patent application number 11 03 759.5 filed Mar. 4, 2011, and United Kingdom patent application number 11 11 403.0 filed Jul. 4, 2011, whose contents are incorporated herein by reference in their entirety.

BACKGROUND OF THE INVENTION

1. Field of the Invention

The present invention relates to a sensor array, and in particular a sensor array that measures capacitive coupling to provide an indication of the magnitude and direction of an applied force.

2. Description of the Related Art

Sensor arrays utilising capacitive sensing are well known in the art. Such arrays are particularly useful for generating a surface map of the magnitude and position of forces applied to them. Many current arrays require that the objects that apply a force to the sensor are themselves conductive, and thus cannot sense the presence of objects composed of insulating materials. In addition, a particular problem with conventional designs lies in their susceptibility to interference from stray capacitance. As they rely on transmitter electrodes lying on the opposite side of a compressible material to receiver electrodes, any attempt to introduce grounded elements results in a near total drop in coupling between electrodes. The amount of noise introduced due to stray capacitances can therefore swamp such prior art systems and result in inaccurate measurements.

BRIEF SUMMARY OF THE INVENTION

According to an aspect of the present invention, there is provided a sensor array for sensing the magnitude and position of a force in a first direction, which sensor array includes: a compressible layer, an electrically grounded layer, and an electrically active layer comprising a plurality of transmitter electrodes and a plurality of receiver electrodes; wherein: each of said transmitter electrodes is configured to capacitively couple to a receiver electrode, and said compressible layer is positioned between said electrically grounded layer said electrically active layer.

According to a further aspect of the present invention, there is provided a method of sensing a force comprising: providing a sensor array having a compressible layer, an electrically grounded layer, and an electrically active layer, which electrically active layer comprises a plurality of transmitter electrodes and a plurality of receiver electrodes; applying input signals to each of said transmitter electrodes to cause capacitive coupling between each of said transmitter electrodes and neighbouring receiver electrodes; detecting output signals from each of said receiver electrodes indicative of the degree of capacitive coupling between each said transmitter electrode and a receiver electrode.

DETAILED DESCRIPTION OF EXAMPLE EMBODIMENTS

FIG. 1

Figure 1:
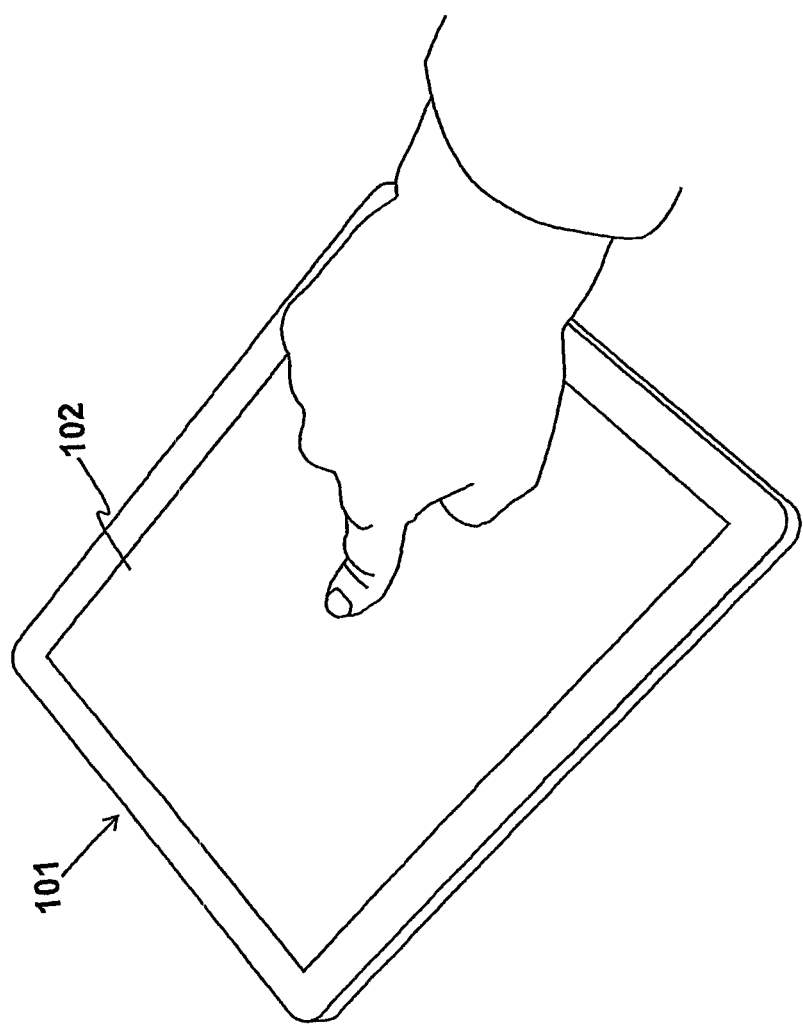
FIG. 1 illustrates a sensor 101 embodying an aspect of the present invention.

A sensor 101 embodying an aspect of the present invention is illustrated in FIG. 1.

Sensor 101 presents a surface 102 upon which a force may be applied. In the example shown in the Figure, the force is being applied by a finger. However, due to the configuration of the present invention, any object that applies a force to sensor 101, whether conductive or not, will result in signals being produced. The present invention provides an apparatus and a method for sensing the magnitude and position of such an applied force in either one or two directions.

FIG. 2

Figure 2:
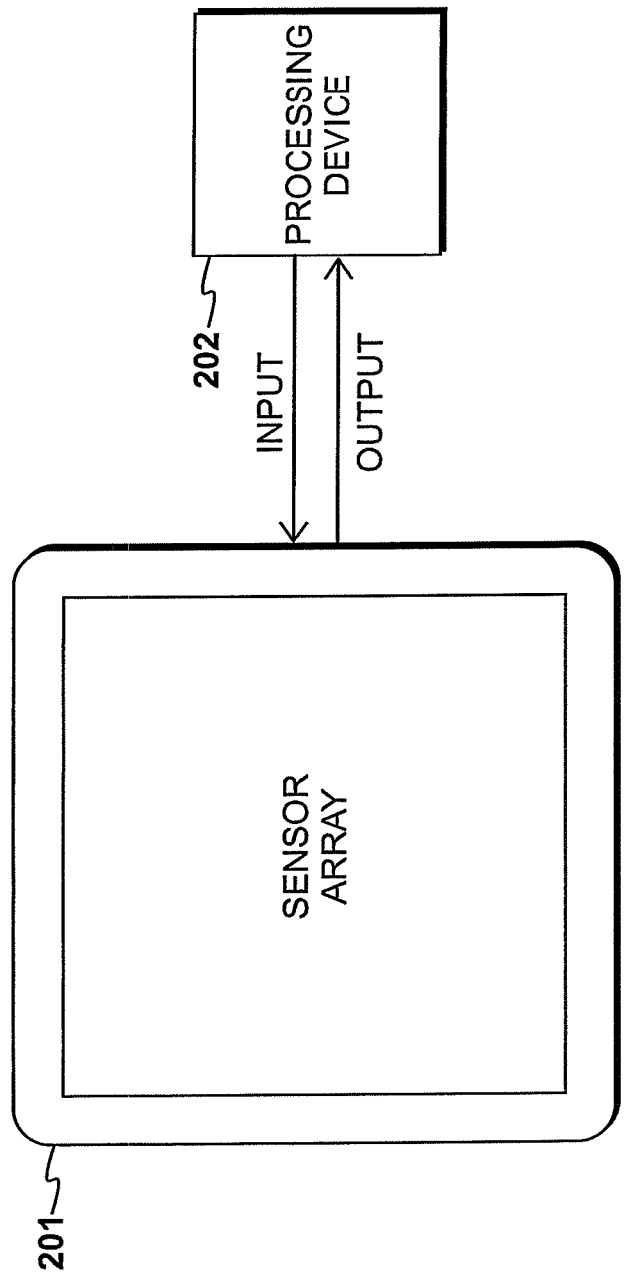
FIG. 2 shows a block diagram of components that provide the functionality of sensor 101.

A block diagram of components that provide the functionality of sensor 101 is shown in FIG. 2.

Sensor 101 comprises a sensor array 201, which provides substantially the core functionality of the present invention. Sensor array 201 is accompanied by a processing device 202, which provides input electrical signals and processes output signals to provide data indicating the magnitude and position of forces applied to sensor array 201.

According to a first exemplary embodiment of the present invention, sensor 101 provides sensing of the magnitude and position of a force in one direction. The way in which a sensor configured according to this first embodiment will be described further with reference to FIGS. 3 to 11.

In addition, in accordance with a second exemplary embodiment of the present invention, sensor 101 provides sensing of the magnitude and position of a force in two substantially mutually orthogonal directions. The way in which a sensor configured according to this second embodiment will be described further with reference to FIGS. 12 to 17.

FIG. 3

Figure 3:
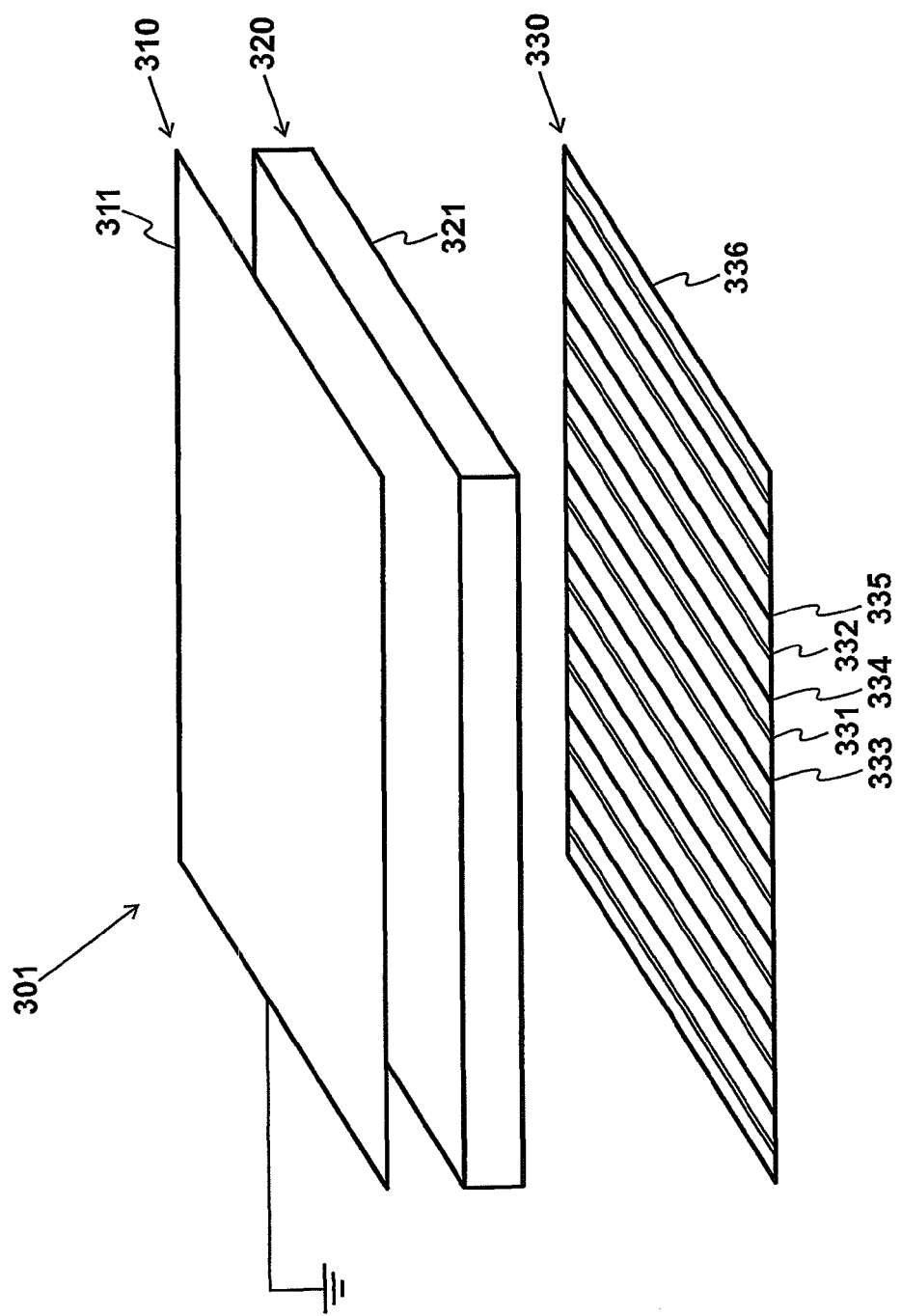
FIG. 3 is an abstraction diagram of the structure of a sensor array 301.

An abstraction diagram of the structure of a sensor array configured in accordance with the first embodiment of the present invention is shown in FIG. 3. Sensor array 301, providing substantially the function of sensor array 201, comprises three layers.

At the top level, sensor array 301 has an electrically grounded layer 310 comprising an electrically grounded element 311, which comprises of a flexible conductive material such as, in the present embodiment, a conductive rubber, but could be comprised of any other sort of suitable flexible conductive material. The grounded element 311, could however It is to be appreciated that reference to electrical "ground" and an element being electrically "grounded" in this description encompass both the case of being physically connected to Earth or to a current carrying body capable of providing a zero-voltage reference level. Thus, the term "ground" as used herein refers to the general case of a body that can be approximated as capable of providing an infinite source of and sink for charge, and can thus absorb an unlimited amount of current without a change in potential of the element connected to it.

A compressible layer 320 is positioned below electrically grounded layer 310, and comprises of a compressible material 321 having a spring constant k. In an example case, compressible material 321 comprises of a dielectric material, such as polyurethane foam. In the embodiment shown in the Figure, electrically grounded element 311 and compressible material 321 are separate, and when sensor array 301 is constructed, they are placed next to each other. In alternative embodiments, the grounded element is in the form of conductive ink printed onto a compressible material for the purposes of reducing the number of components. However, this would still represent a presence of an electrically grounded layer and a compressible layer. Thus, it will be appreciated that, in the context of the present invention, electrically grounded layer 310 and compressible layer 320 could be an ensemble or could be discrete components.

At the bottom level, an electrically active layer 330 is provided which comprises a plurality of transmitter electrodes, such as transmitter electrodes 331 and 332, and a plurality of receiver electrodes, such as receiver electrodes 333, 334 and 335. The convention of representing transmitter electrodes with a white fill, and receiver electrodes with a black fill will be adhered to throughout the accompanying drawings. Each of the transmitter electrodes is configured to capacitively couple to at least one receiver electrode.

In an example, the transmitter electrodes and the receiver electrodes comprise of conductive ink printed onto respective sides of a single membrane 336. Alternatively, the electrodes can be printed onto the same side of a single membrane, with appropriate modification of printing patterns to avoid short circuits. In a further alternative arrangement, electrically active layer 330 comprises of two membranes, with the transmitter electrodes being printed onto one membrane and the receiver electrodes being printed onto the other.

On application of a voltage to a transmitter electrode, an electric field forms which causes capacitive coupling to other receiver electrodes in close proximity. The capacitive coupling between the electrodes will be described further with reference to FIGS. 5 and 6.

FIG. 4

Figure 4:
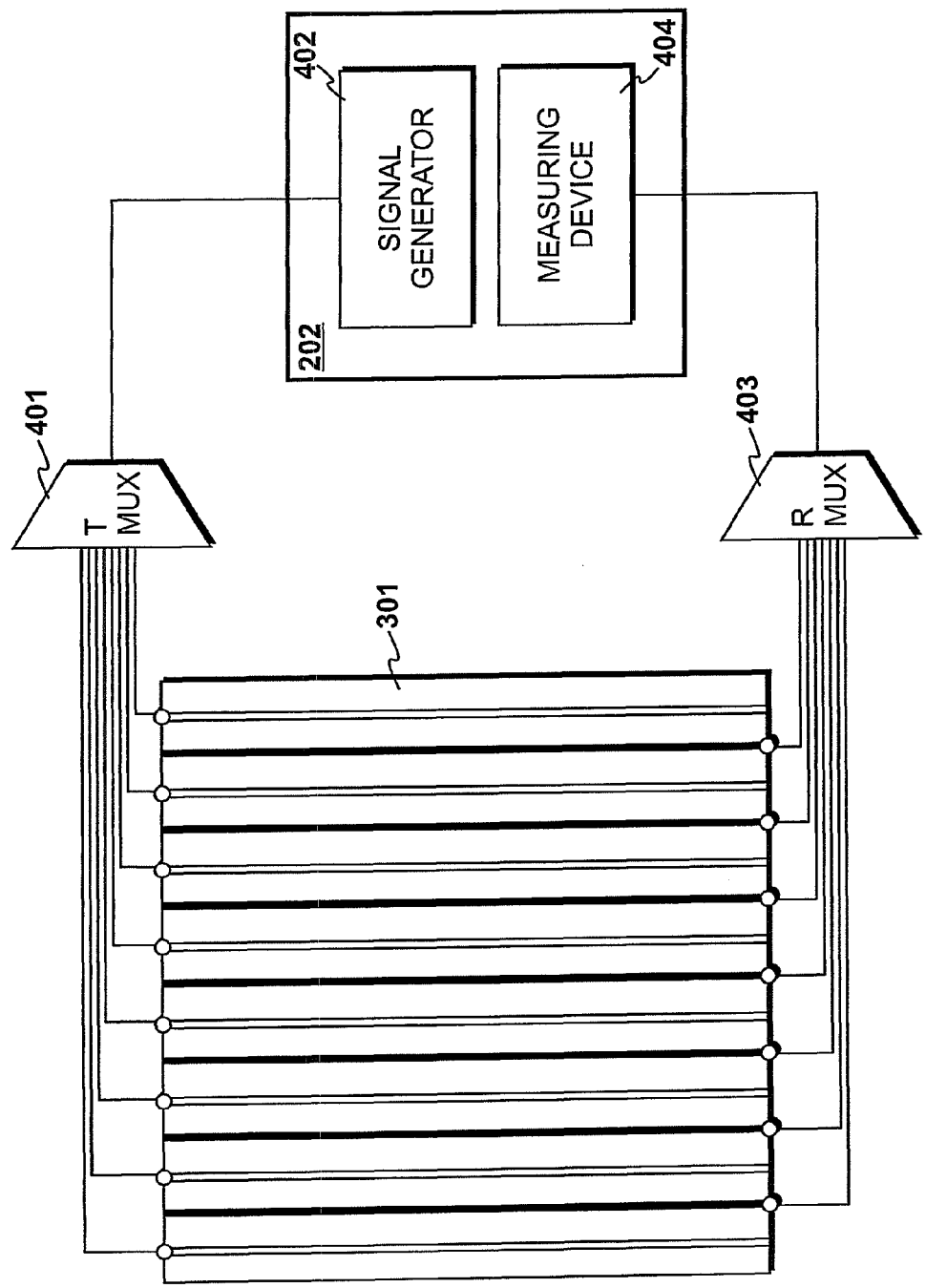
FIG. 4 is a more detailed illustration of sensor array 301.
Figure 5:
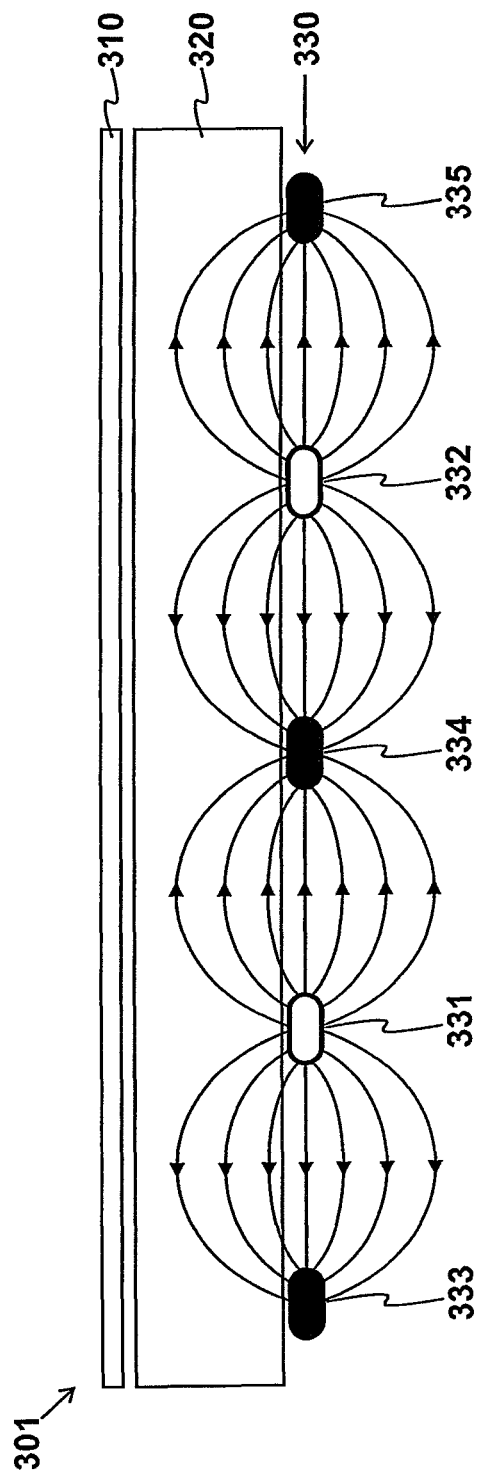
FIG. 5 shows the electric field formed within a portion of sensor array 301.

A more detailed illustration of sensor array 301 when part of the sensor system illustrated in FIG. 2 is shown in FIG. 4.

As shown in the Figure, sensor array 301 is electrically connected via a pair of multiplexers to processing device 202. A transmitter multiplexer 401 multiplexes input signals from a signal generator 402 within processing device 202 across each of the transmitter electrodes. A receiver multiplexer 403 multiplexes output signals from each receiver electrode into a measuring device 404.

In the present embodiment, signal generator 402 produces input signals, which, in an example, are square waves. Alternative waveforms, such as saw-tooths or sine waves, could be used depending upon the requirements of the sensor array. The input signals are produced with reference to resolution of the clock (not shown) of processing device 202, which, in this example has a frequency of one megahertz. A multiple, say 1 kilohertz, of this base resolution is defined as f, and signal generator 402 produces input signals at a rate of repetition 2f (f multiplied by two). Transmitter multiplexer 401 multiplexes these input signals in sequence and at a rate f, thus resulting in two input signals being applied to each transmitter electrode. Receiver multiplexer 403 is also configured to multiplex output signals from the receiver electrodes at a rate f, albeit 180 degrees out of phase with transmitter multiplexer 401. The result of this multiplexing of input and output signals will be described further with reference to FIGS. 9 and 10. In addition, the operation of measurement device 404 will also be described further, with reference to FIG. 7.

FIG. 5

The electric field formed within a portion of sensor array 301 when a voltage is applied to transmitter electrodes 331 and 332 is shown in cross-sectional view in FIG. 3.

When electrically grounded layer 310 is positioned relatively far from electrically active layer 330 as shown in the Figure, the majority of flux lines of the electric field loop from transmitter electrode 331 to receiver electrodes 333 and 334 so as to effect capacitive coupling. A similar situation can be seen between transmitter electrode 332 and receiver electrodes 334 and 335.

FIG. 6

As described previously with reference to FIG. 5, the flux lines of the electric field around the top of transmitter electrode 331 will tend to loop to receiver electrodes 333 and 334, thus causing capacitance coupling.

Figure 6A:
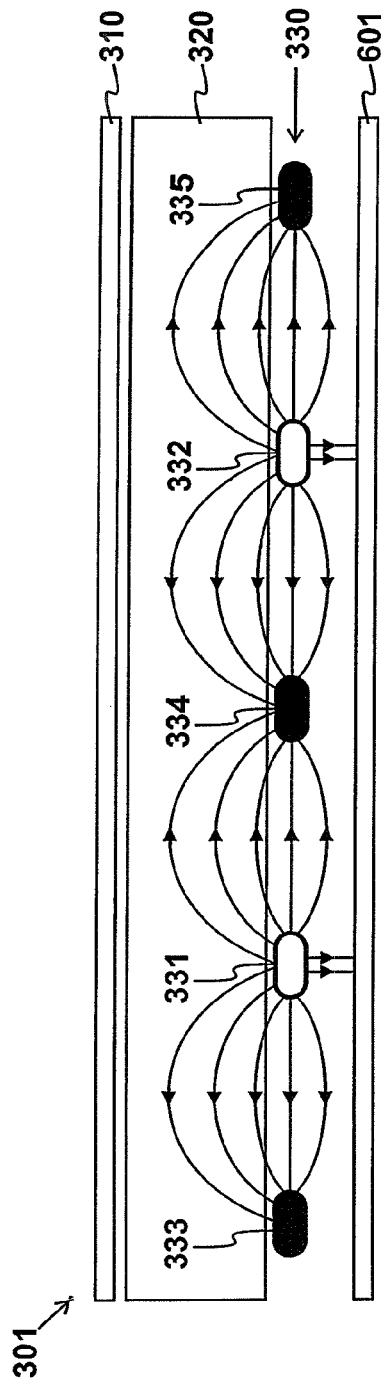
FIG. 6 shows the flux lines of the electric field around a transmitter electrode.

As shown in FIG. 6A, the addition of second electrically grounded layer comprising grounding element 601 at the bottom of sensor array 301 results in the majority of flux lines of the electric field around the bottom of transmitter electrodes 331 and 332 snapping to ground. Thus, the only substantial capacitive coupling between the transmitter electrodes and the receiver electrodes is through compressible layer 320. This presents a large advantage in terms of reducing the effect of stray capacitances on the coupling between transmitter and receiver electrodes.

Figure 6B:
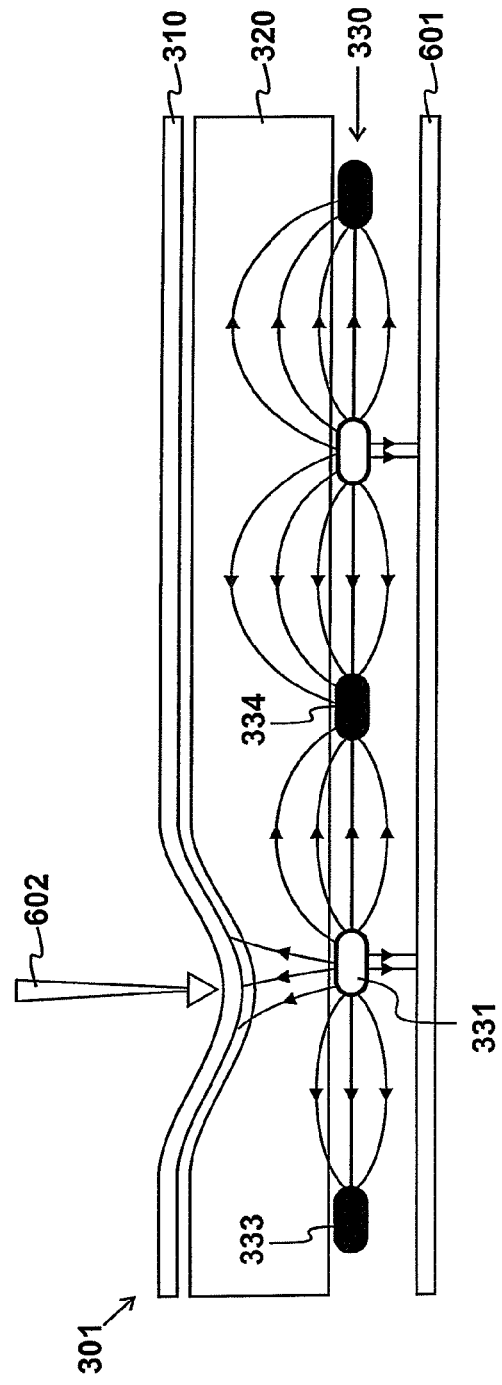

The effect of compression of sensor array 301 is shown in FIG. 6B. When a force such as force 602 having a magnitude F is applied to sensor array 301, compressible material 321 in compressible layer 320 compresses and electrically grounded layer 310 thus moves closer to electrically active layer 330. The electric field's flux lines from the top of transmitter electrode 331 are thus shown in the Figure now having snapped to grounded element 310.

In the example shown in FIGS. 6A and 6B, therefore, the electric field from transmitter electrode 331 has gone from causing a high level of capacitive coupling with receiver electrode 333 when no force is applied to a low level of capacitive coupling when a force is applied. The level of reduction in capacitive coupling between transmitter electrode 331 and receiver electrode 333 is dependent upon the magnitude of the applied force, which determines the degree to which the compressible layer is compressed and has thus allowed the electrically grounded layer to move.

As shown in the Figure, though, this change in capacitive coupling has only occurred between transmitter electrode 331 and receiver electrode 333; the reduction in capacitive coupling between transmitter electrode 331 and receiver electrode 334 is not reduced by the same amount. This therefore indicates that the position of force 602 is to one side of transmitter electrode 331. Thus, by providing a first input signal to transmitter electrode 331, and receiving a corresponding first output signal from receiver electrode 333, followed by providing a second input signal to transmitter electrode 331, and receiving a corresponding second output signal from receiver electrode 334, it is possible to ascertain the position of force 602 with respect to transmitter electrode 331.

Additionally, assume for a moment that force 602 was positioned nearer to receiver electrode 334. It will thus be appreciated that a similar method of detection can be achieved by providing a first input signal to transmitter electrode 331, and receiving a corresponding first output signal from receiver electrode 334, followed by providing a second input signal to transmitter electrode 332, and receiving a corresponding second output signal from receiver electrode 334.

FIG. 7

Figure 7:
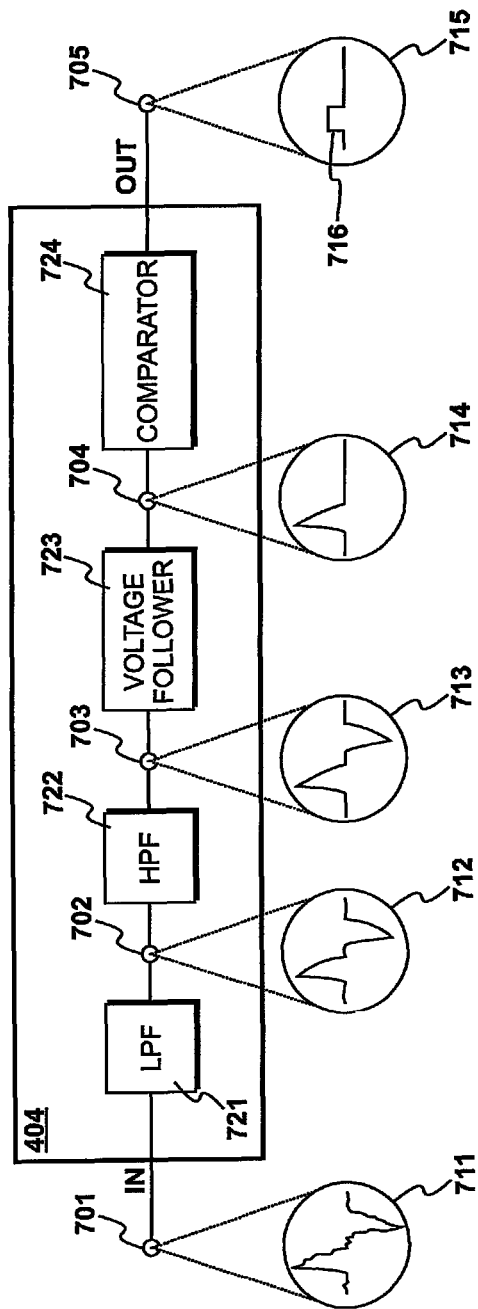
FIG. 7 shows a measuring device used to sample the output signal from a receiver electrode.

The measuring device used to sample the output signal from a receiver electrode is shown in FIG. 7.

Measuring device 404 was previously described with reference to FIG. 4, in that it was arranged to receive at an input a signal from receiver multiplexer 403 and to output a sample signal indicative of the degree of capacitive coupling on a receiver electrode.

For the purposes of this example, it is assumed that the force sensor producing a signal is the sensor array shown in FIG. 6B, and, due to the provision of the lower grounding plate, has not been affected by stray capacitance and other forms of outside electrical interference. The signal produced in a receiver electrode is a voltage that peaks and decays in a positive sense when an increase in voltage is applied to a neighbouring transmitter electrode, and peaks and decays in a negative sense when a decrease in voltage is applied to a neighbouring transmitter electrode. This is due to the changes in the strength of the electric field (and therefore the capacitive coupling) between the transmitter and the receiver electrodes. These changes cause charge to flow to and from the receiver electrode under the influence of an induced electromotive force, which in turn results in the manifestation of a voltage on the receiver electrode.

Measuring device 404 includes an input terminal 701 at which an example signal 711 multiplexed from a receiver electrode is shown. Signal 711 is conditioned by low pass filter 721 which filters out high frequency components of the signal to give a first filtered signal 712. First filtered signal 712 is then provided to an input 702 of a high pass filter 722 that filters out low frequency components. This filtering gives a second filtered signal 713 that is provided to one input 703 of a voltage follower 723, which is configured to output a signal 714 representing only the positive portion of second filtered signal 713. Voltage follower 703 has an extremely high input impedance and a very low output impedance, and thus serves to avoid crosstalk between the two sides of measuring device 404. The output from voltage follower 723 is provided to an input 704 of a comparator 724 which is configured to compare signal 714 to a threshold voltage. This comparison process produces a comparison signal 715 having a pulse 716 at output 705 whose width in the time domain is equal to the width of signal 714 that exceeds the threshold voltage. Given identical input signals on a neighbouring transmitter electrode, the response of a receiver electrode is always identical in profile. However, the amplitude of the output signal changes in dependence upon the level of capacitive coupling present. The duration of comparison signal 715 is therefore proportional to the amplitude of the voltage developed at the receiver electrode and in turn the amount of force applied to the sensor.

The comparison signals produced by measuring device 404 are sampled by processing device 202 by timing their durations with reference to its internal clock. The durations are stored in memory as duration data for further analysis.

FIG. 8

Figure 8:
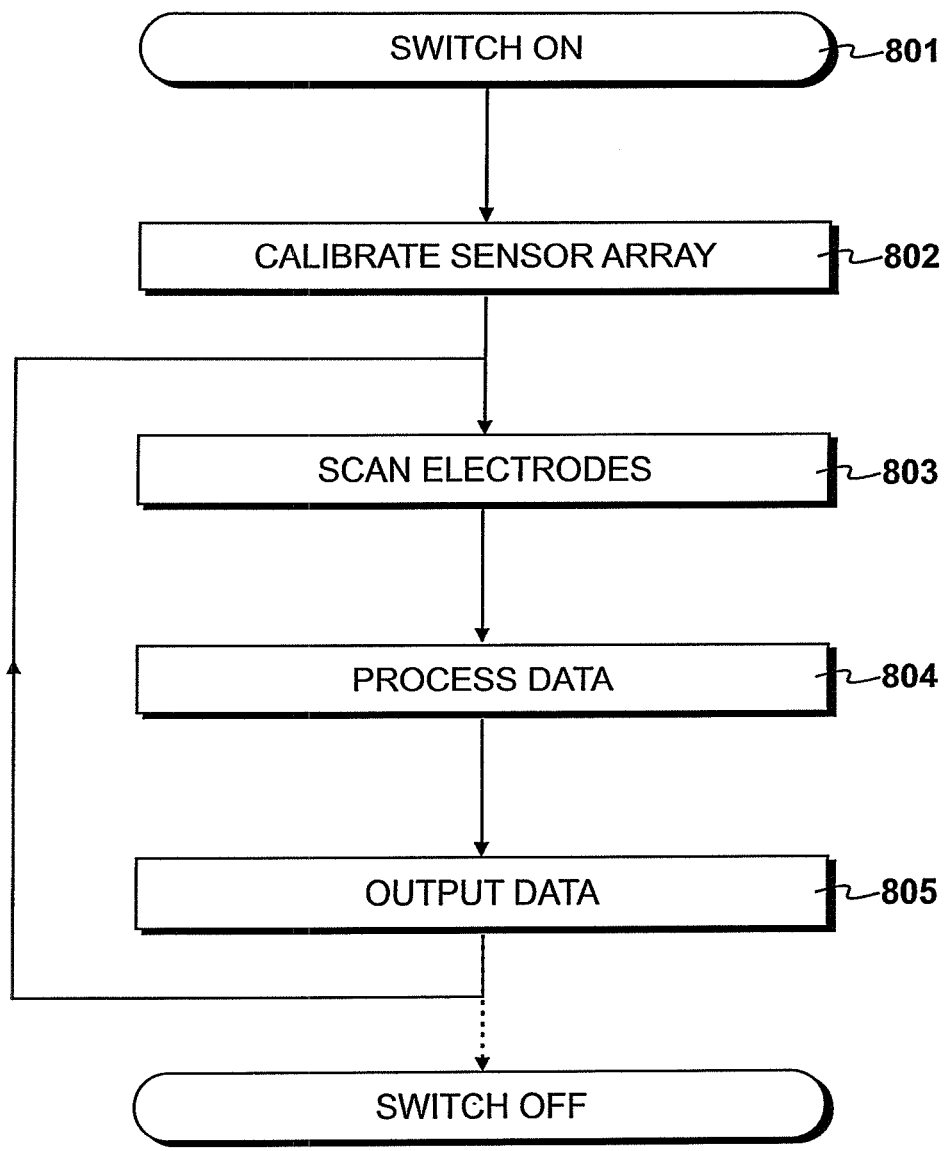
FIG. 8 details steps carried out to initialize sensor 101.

Steps carried out to initialize sensor 101 by processing device 202 are detailed in FIG. 8.

At step 801, the sensor is switched on, and at step 802 a calibration procedure is run. The calibration procedure is carried out with no intentional pressure applied to the sensor array, and serves to establish reference values for capacitive coupling between transmitter and receiver electrodes. At step 803, the sensor array is scanned by transmitting on each transmitter electrode and receiving on each receiver electrode as described previously with reference to FIG. 4. This results in measurement signals being produced by measuring device 404, which are timed by the processing device to produce duration data.

At step 804, the duration data produced by processing device 202 is processed, and outputted at step 805 for further analysis. Control then returns to step 803 where the array is scanned again, or the sensor is switched off.

FIG. 9

Figure 9:
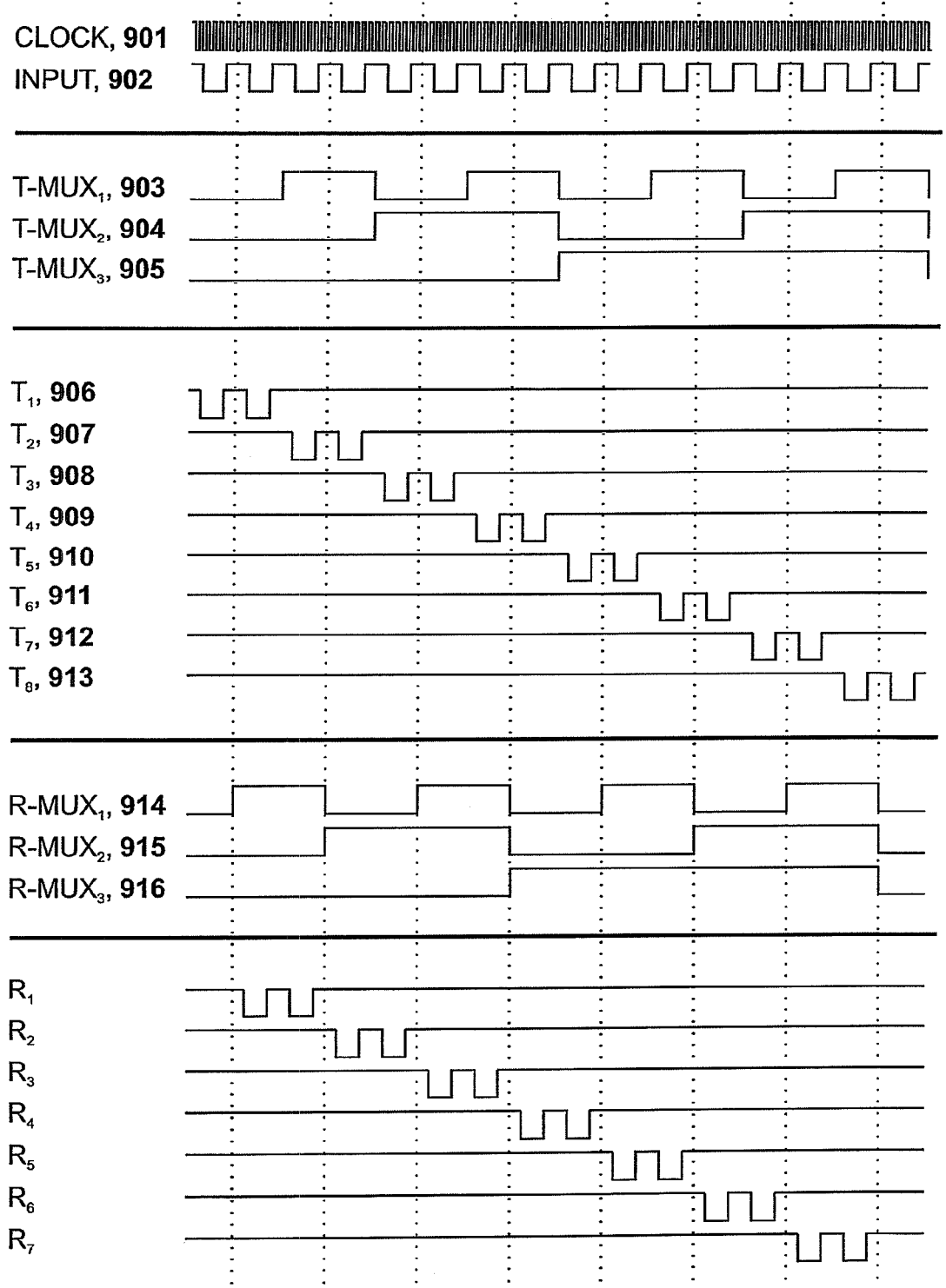
FIG. 9 shows the process of scanning transmitter and receiver electrodes.

The process of scanning transmitter and receiver electrodes in a sensor array in accordance with an aspect of the present invention is shown in the form of a timing diagram in FIG. 9.

A clock signal is shown at 901, and provides a reference signal by which all other timings abide by. In this example, the clock frequency is one megahertz, but in other embodiments the frequency is higher or lower depending upon the resolution required. At 902, an input signal produced by signal generator 402 is illustrated and has a frequency of repetition of 2f. In this example, f is some multiple of the clock frequency shown at 901, which in the present embodiment is 1 kilohertz. Signal generator 402 therefore produces input signals at a frequency of repetition of 2 kilohertz. As previously described with reference to FIG. 4, transmitter multiplexer 401 is configured to multiplex input signals from signal generator 402 across each transmitter electrode in sensor array 301. For this purpose, it includes three switching channels which are controlled by signals illustrated at 903, 904 and 905. By altering the switching of each channel, it is possible to multiplex input signals across $2^3=8$ channels. The transmitter multiplexer is therefore configured to switch between its outputs in sequence and at a frequency f, which, in keeping with this example, would be at a frequency of 1 kilohertz. As shown at 906 through 913, this results in two pulses being applied to each transmitter electrode.

The switching of channels in receiver multiplexer 403 to multiplex output signals from each receiver electrode into measuring device 404 is shown at 914, 915 and 916. In a similar fashion to transmitter multiplexer 401, receiver multiplexer is configured so as to switch between input channels in sequence at a frequency f, which in this case is 1 kilohertz. However, the switching of inputs occurs 180 degrees out of phase with the switching in transmitter multiplexer 401, and so results in two output signals from each receiver electrode being provided to the measuring device. One output signal is derived from a signal transmitted from a transmitter electrode to one side of the receiver electrode, and a second output signal is derived from a signal transmitted from a transmitter electrode to another side of the receiver electrode.

In effect, therefore, each receiver electrode "listens" for capacitive coupling from a transmitter electrode to its left and then a transmitter electrode to its right. This allows the recording of two measurements of the degree of capacitive coupling per receiver electrode and the subsequent processing to produce interpolated data. Clearly, in the example shown in the Figures, there are only seven receiver electrodes, and so one of the inputs of receiver multiplexer 403 will be connected to ground such that the measuring device receives zero input when the corresponding channel is selected.

FIG. 10

Figure 10:
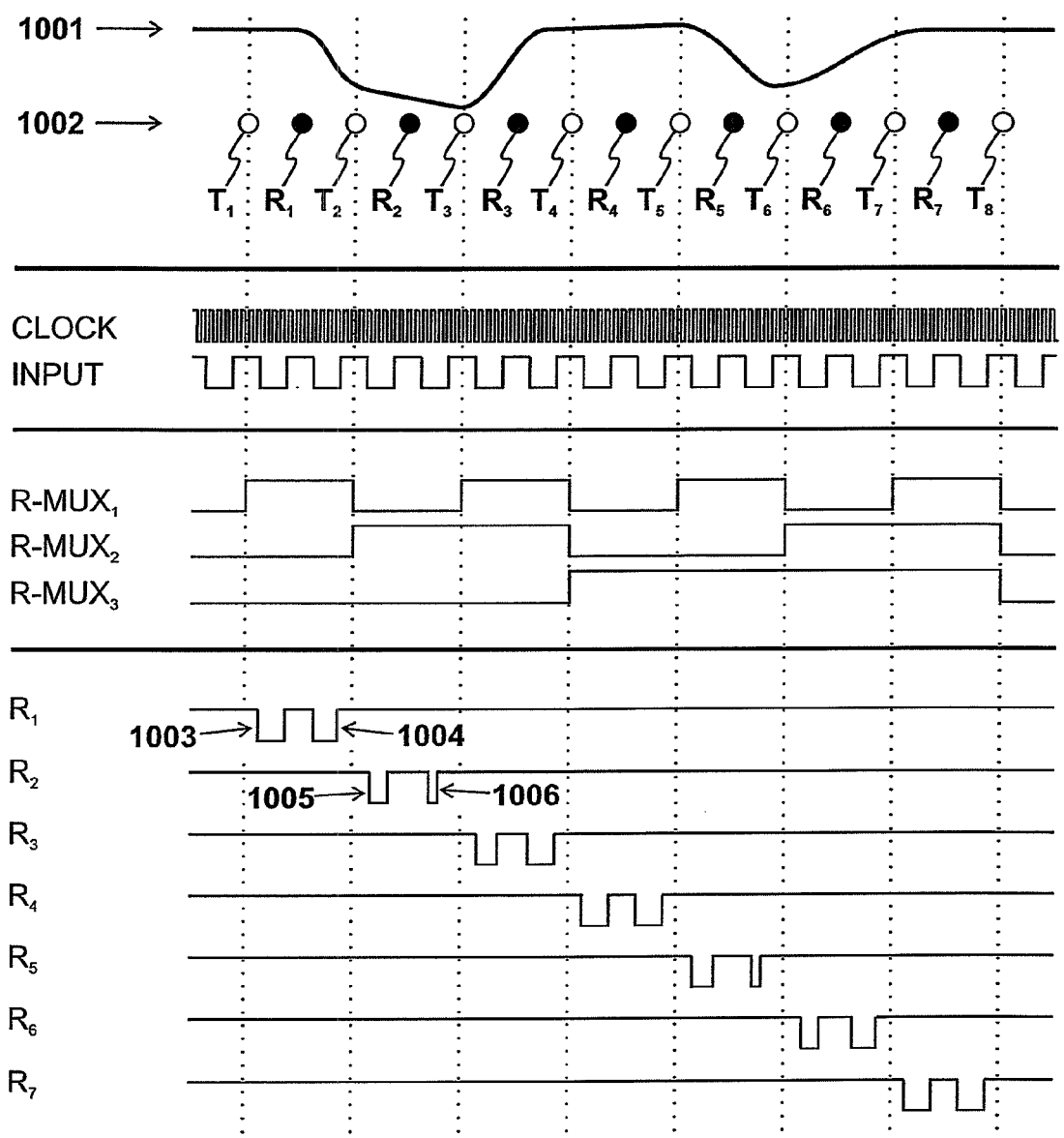
FIG. 10 shows an example of signals provided to the measuring device when a force is applied at two points.

An example of the signals provided to the measuring device 404 when a force is applied at two points on the sensor array 201 is shown in FIG. 10.

The depression of electrically grounded layer 310 and compressible layer 320 is shown at 1001, with the arrangement of transmitter electrodes (labelled $T_1$ to $T_8$) and receiver electrodes (labelled $R_1$ to $R_7$) illustrated at 1002.

At 1003, the clock signal is illustrated, again running at a frequency of one megahertz. Input signals shown at 1004 are produced at a frequency of repetition of 2 kilohertz, and multiplexed across the transmitter electrodes as previously described with reference to FIG. 9. The switching of inputs in receiver multiplexer 403 results in all of the signals formed on the receiver electrodes being provided to measuring device 404. For ease of illustration, the measurement signals produced by the measuring device are shown for the respective receiver electrode that they originated from, and are labelled $R_1$ to $R_7$.

When considering $R_1$, the measurement signal produced when an input signal is applied to transmitter electrode $T_1$ is shown at 1003, and the measurement signal produced when an input signal is applied to transmitter electrode $T_2$ is shown at 1004. As there is no depression in the electrically grounded layer between $T_1$ and $R_1$, there is no reduction in the degree of capacitive coupling and so the width of measurement signal 1003 is not reduced. As there is indeed a depression between $R_1$ and $T_2$, there is a reduction in the width of measurement signal 1004. The difference between signals is shown more markedly at 1005 and 1006, where there is a clear increase in the amount of depression of the electrically grounded layer, and so the degree of capacitive coupling between $T_2$ and $R_2$ and $T_3$ and $R_2$ is much reduced. This results in much narrower measurement signals, which indicate a much higher degree of compression at these points.

In this embodiment, as the frequency of switching of the multiplexers happens at 1 kilohertz, and so a total scan of the array occurs at a frequency of 125 hertz.

The duration of each of the measurement signals produced by measuring device in a single scan is compared with the clock signal to produce duration data, which is stored in memory in processing device 202. The duration data may then be provided to a personal computer (not shown) for later analysis, or processed within the processing device to produce interpolated data. The process of producing interpolated data will be described with reference to FIG. 11.

FIG. 11

As described above, duration data is produced on each scan of the sensor array. In order to provide meaningful output, it is useful to interpolate this data. As the resolution of the clock signal is high, it gives very accurate values for duration data representing the width of the output signals produced by the receiver electrodes.

Figure 11:
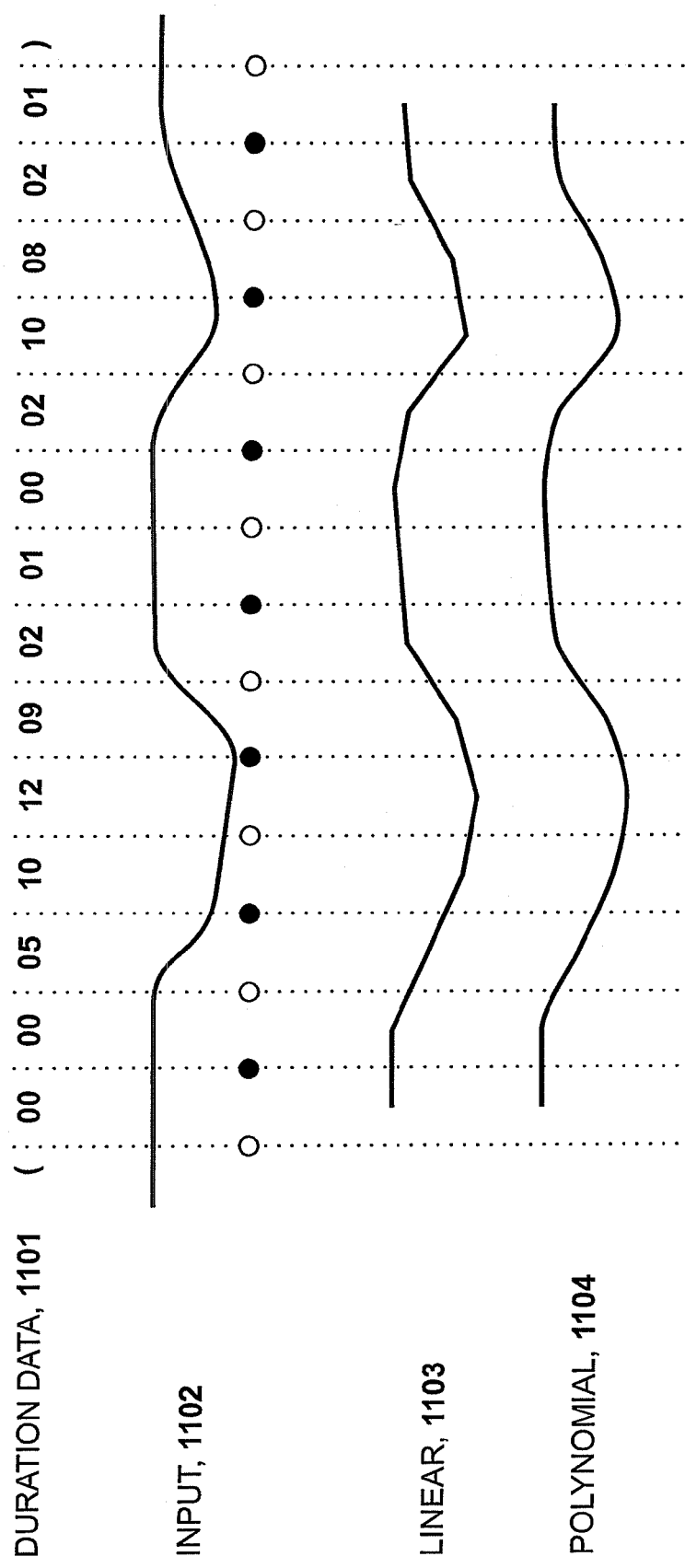
FIG. 11 shows duration data produced during a scan of the sensor array.

Thus, as shown in FIG. 11, the duration data produced during a scan of the sensor array is illustrated at 1101 and comprises 14 entries, i.e. two for each of the seven receiver electrodes. The "input" to the array, i.e. the depression of the electrically grounded layer, is shown at 1102 with the transmitter and receiver electrodes beneath. The application of linear interpolation between the points defined by the duration data is illustrated at 1103, and clearly gives a good approximation to the deformation of the electrically grounded layer under the influence of applied forces. In order to improve the interpolated data, polynomial interpolation may be applied which results in the approximation shown at 1104. In this case, second order polynomial interpolation has been applied, although it has been found that, if the processing capability is available, interpolation of an order the same as the number of receiver electrodes provides an extremely good approximation to the actual depression of the electrically grounded layer.

Furthermore, it has been recognized that in order to provide a more accurate output when performing n-order polynomial interpolation, it is useful to firstly estimate values for the force being applied directly on top of transmitter and receiver electrodes. As the raw data output is indicative of the magnitude of an applied force at a position halfway between a transmitter and a receiver electrode, then given two of these values an average can be taken and used as an estimate of what the value would be directly on top of an electrode. This estimation process aids substantially when the order of the polynomial interpolation becomes large.

FIG. 12

Whilst the present invention has thus far been described with reference to an embodiment that senses the magnitude and position of a force in one direction, a second embodiment provides for sensing in two directions.

Figure 12:
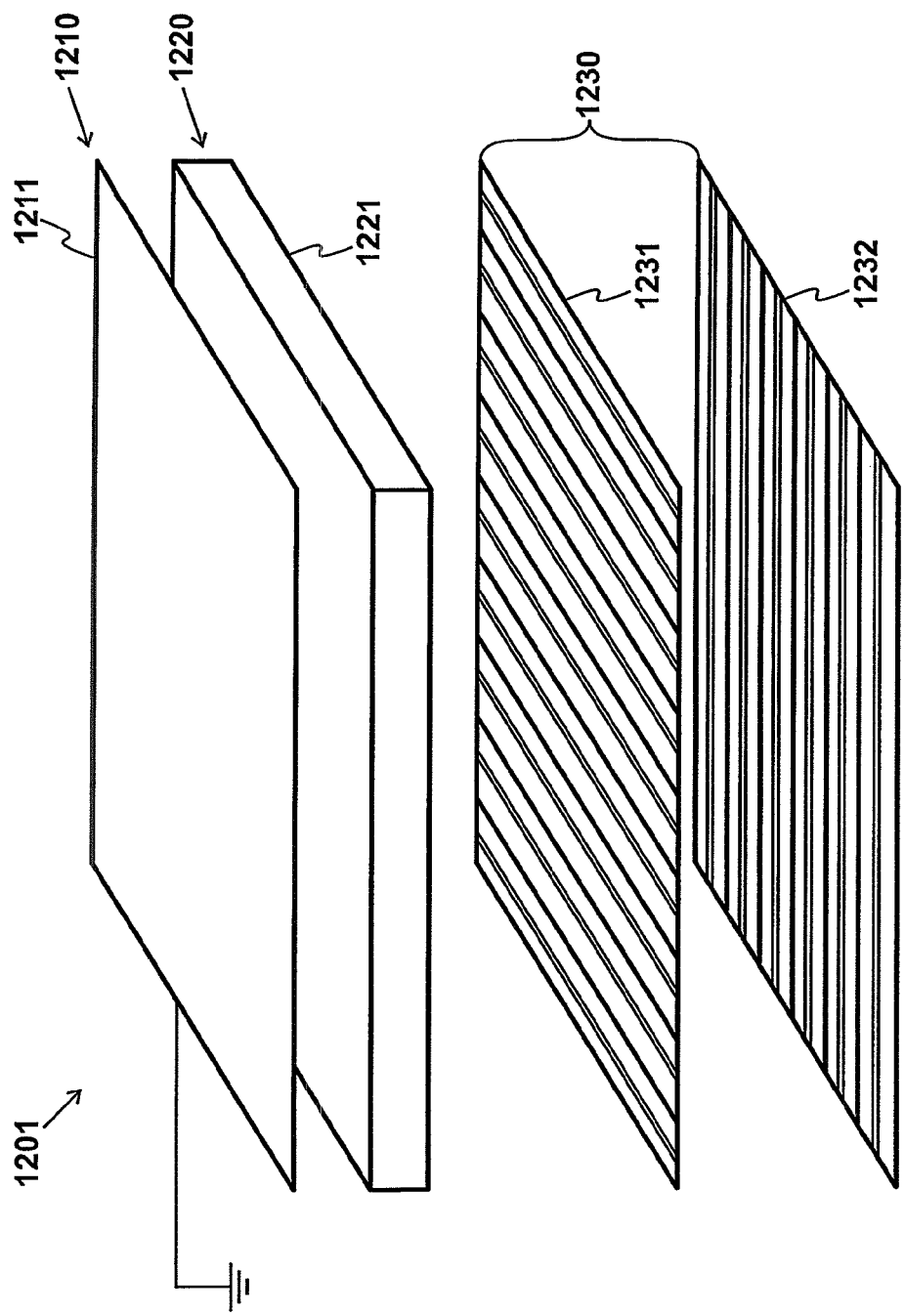
FIG. 12 is an abstraction diagram of the structure of a sensor array in accordance with a second embodiment of the present invention.

An abstraction diagram of the structure of a sensor array in accordance with this second embodiment is therefore shown in FIG. 12. In a similar way to the first embodiment described previously with reference to FIG. 3, sensor array 1201 comprises three layers: an electrically grounded layer 1210, a compressible layer 1220 and an electrically active layer 1230. Electrically grounded layer 1210 and compressible layer 1220 are substantially the same as electrically grounded layer 310 and compressible layer 320, and so each comprise an electrically grounded element 1211 and a compressible material 1221 respectively. Electrically active layer 1230 also includes a first membrane 1231 which is substantially the same as membrane 336. In this embodiment, however, electrically active layer 1230 also includes a second plurality of transmitter electrodes and a second plurality of receiver electrodes arranged, in this example, on a second membrane 1232. Second membrane 1232 is arranged such that its transmitter electrodes and receiver electrodes lie substantially mutually orthogonally to those on first membrane 1231, and, as will be described further with reference to FIG. 13, allows sensor array 1201 to sense the magnitude and position of an applied force in two mutually orthogonal directions. In the present embodiment, transmitter electrodes and receiver electrodes are printed on one side only of the membranes. Thus, the membranes are placed together with their blank sides touching so as to avoid short circuiting. In alternative cases, an insulating material could be placed between the membranes, or each set of transmitter and receiver electrodes could be printed on respective sides of the same membrane in order to reduce costs.

FIG. 13

Figure 13:
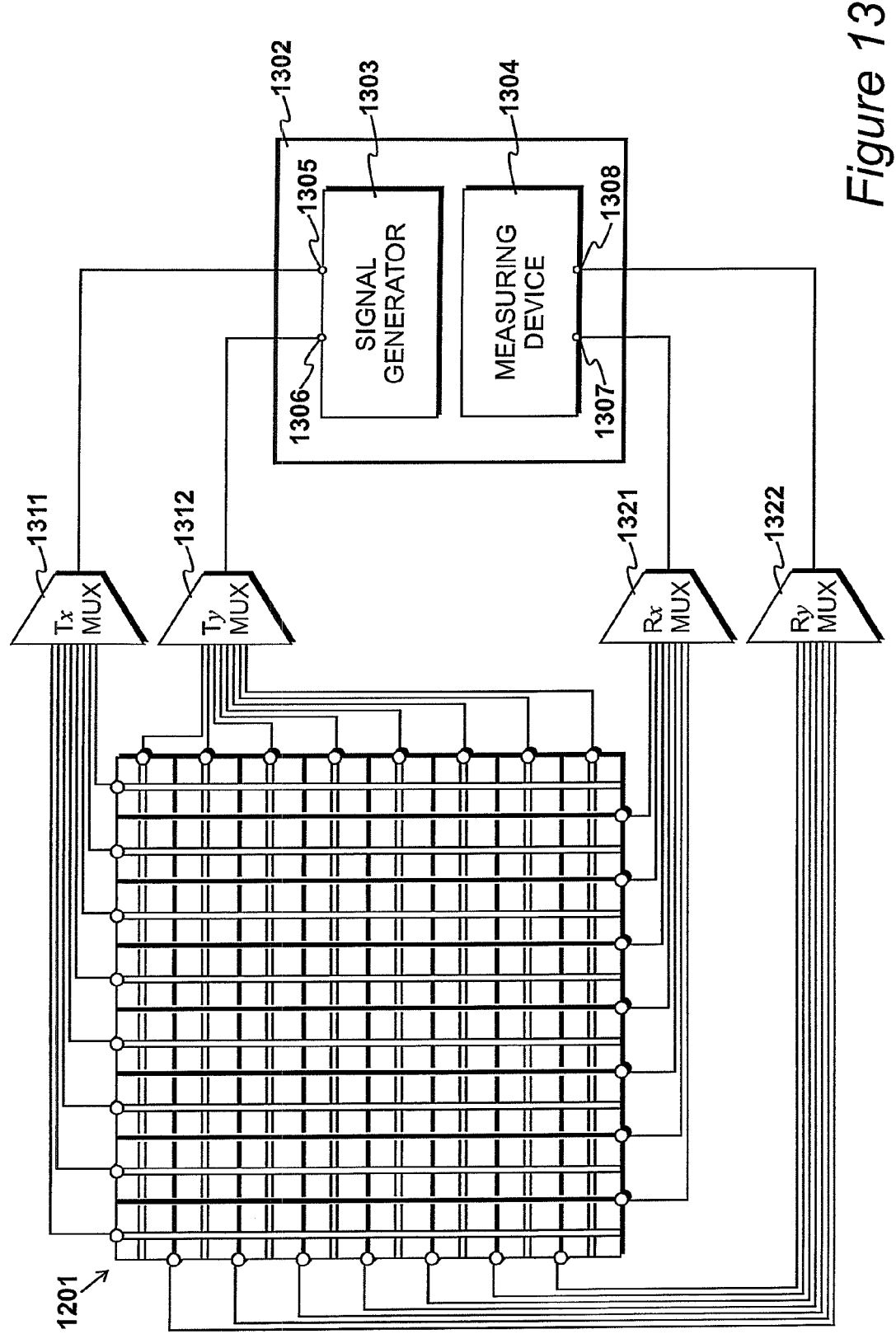
FIG. 13 shows an exemplary arrangement of a sensor 1301.

An exemplary arrangement of a sensor 1301 including sensor array 1201 is shown in FIG. 13.

A processing device 1302 includes a signal generator 1303 (configured in substantially the same way to signal generator 402) and a measuring device 1304 (configured substantially in the same way to measuring device 404).

Connected to a first output 1305 of the signal generator is a transmitter multiplexer 1311, and connected to a second output 1306 of the signal generator is a transmitter multiplexer 1312. As shown in the Figure, transmitter multiplexer 1311 is connected to transmitter electrodes in the x-direction, and transmitter multiplexer 1312 is connected to transmitter electrodes in the y-direction. It will be appreciated that transmitter multiplexers 1311 and 1312 are substantially the same as transmitter multiplexer 401.

In addition, connected to a first input 1307 of measuring device 1304 is a receiver multiplexer 1321, connected to a second input 1308 of measuring device 1304 is a receiver multiplexer 1322. As shown in the Figure, receiver multiplexer 1321 is connected to receiver electrodes in the x-direction, and receiver multiplexer 1322 is connected to receiver electrodes in the y-direction. Again, it will be appreciated that receiver multiplexers 1321 and 1322 are substantially the same as receiver multiplexer 403.

FIG. 14

Figure 14:
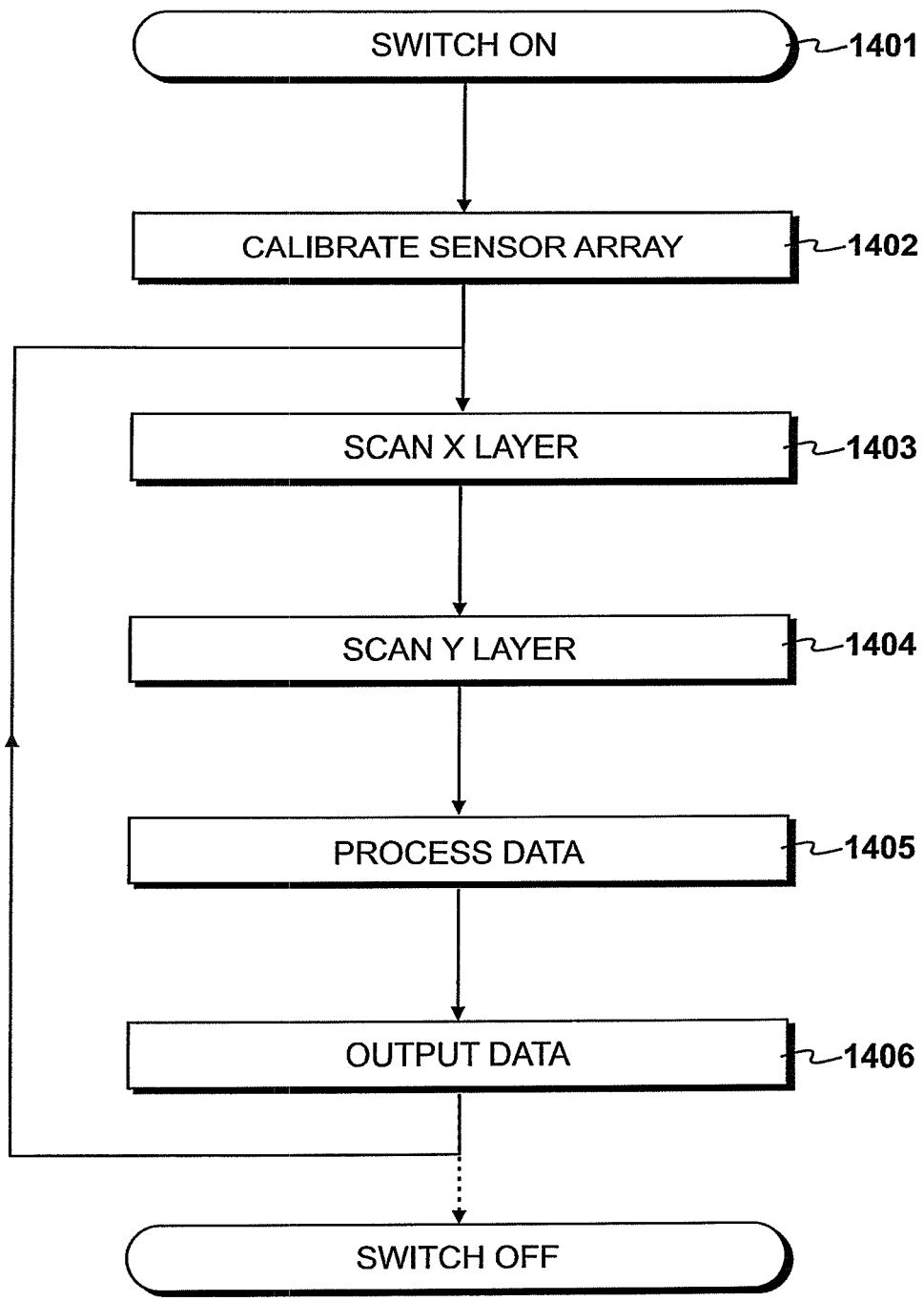
FIG. 14 details steps carried out to initialize sensor 1301.

Steps carried out to initialize sensor 1301 by processing device 1302 are detailed in FIG. 14.

At step 1401, the sensor is switched on, and at step 1402 a calibration procedure is run. The calibration procedure is carried out with no intentional pressure applied to the sensor array, and serves to establish reference values for capacitive coupling between transmitter and receiver electrodes.

At step 1403, the sensor array is scanned in the x-direction by transmitting on each transmitter electrode connected to transmitter multiplexer 1311, and receiving on each receiver electrode connected receiver multiplexer 1321. At step 1404, the sensor array is scanned in the y-direction by transmitting on each transmitter electrode connected to transmitter multiplexer 1312, and receiving on each receiver electrode connected to receiver multiplexer 1322. During these scans, duration data is produced by processing device 1302 following the production of measurement signals by measuring device 1304.

At step 1405, the duration data produced by processing device 1302 is processed, and outputted at step 1405 for further analysis. Control then returns to step 1403 where the array is scanned again, or the sensor is switched off.

By performing a scan in the x-direction and then performing a scan in the y-direction, each scan being similar to that previously described with reference to FIG. 10, it is possible to produce duration data for both the x- and the y-direction. This can then be interpolated as described previously with reference to FIG. 11, and combined to create a surface map using, say, an adaptive mesh algorithm.

FIG. 15

Figure 15:
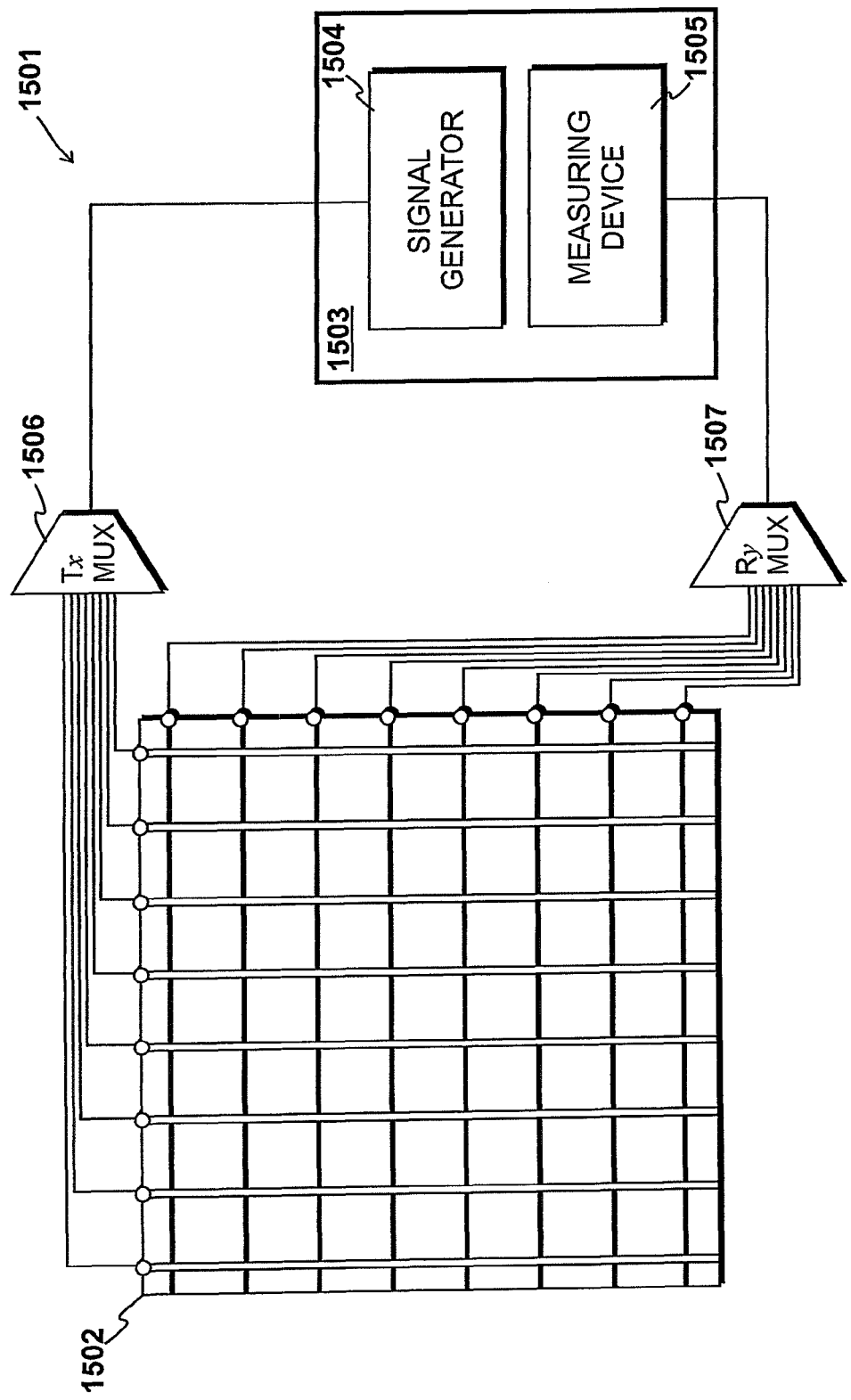
FIG. 15 shows an alternative arrangement of the transmitter and receiver electrodes in a sensor array 1502.

An alternative arrangement of the transmitter and receiver electrodes in a sensor array in accordance with an aspect of the present invention is shown in FIG. 15.

In this example, a sensor 1501 includes a sensor array 1502 and a processing device 1503 comprising a signal generator 1504 and a measuring device 1505. Signal generator 1504 and measuring device 1505 are respectively connected to a transmitter multiplexer 1506 and a receiver multiplexer 1507. Sensor array 1502 comprises a plurality of transmitter electrodes arranged substantially perpendicular to a plurality of receiver electrodes. As with sensor array 301 and 1301, sensor array 1502 includes an electrically grounded layer, a compressible layer and an electrically active layer, within which the transmitter and receiver electrodes are located. The capacitive coupling in the electrically active layer will be described further with reference to FIG. 16.

By configuring transmitter multiplexer 1506 and receiver multiplexer 1507 accordingly, then one input signal from signal generator 1504 is applied to each transmitter electrode in sequence whilst signals from one receiver electrode are received. Receiver multiplexer 1507 then switches to the next receiver electrode, and input signals are then applied to each transmitter electrode again. Thus, given an array having eight transmitter electrodes arranged substantially perpendicularly to eight receiver electrodes, and being provided with input signals having a frequency of repetition 8f, the transmitter multiplexer switches across each transmitter electrode at a frequency 8f, and the receiver multiplexer switches between each receiver electrode at a frequency f.

Of course, it will be clear to those skilled in the art that the composition of sensor array 1502 is substantially similar to sensor array 1301. In effect, similar results could be achieved with sensor array 1301 by providing switches on transmitter multiplexer 1312 and receiver multiplexer 1321 that in effect change their connected electrodes' roles to receivers and transmitters respectively. Thus, transmitter multiplexer 1312 would become connected to measuring device 1304 and receiver multiplexer 1321 would become connected to signal generator 1303.

FIG. 16

Figure 16A:
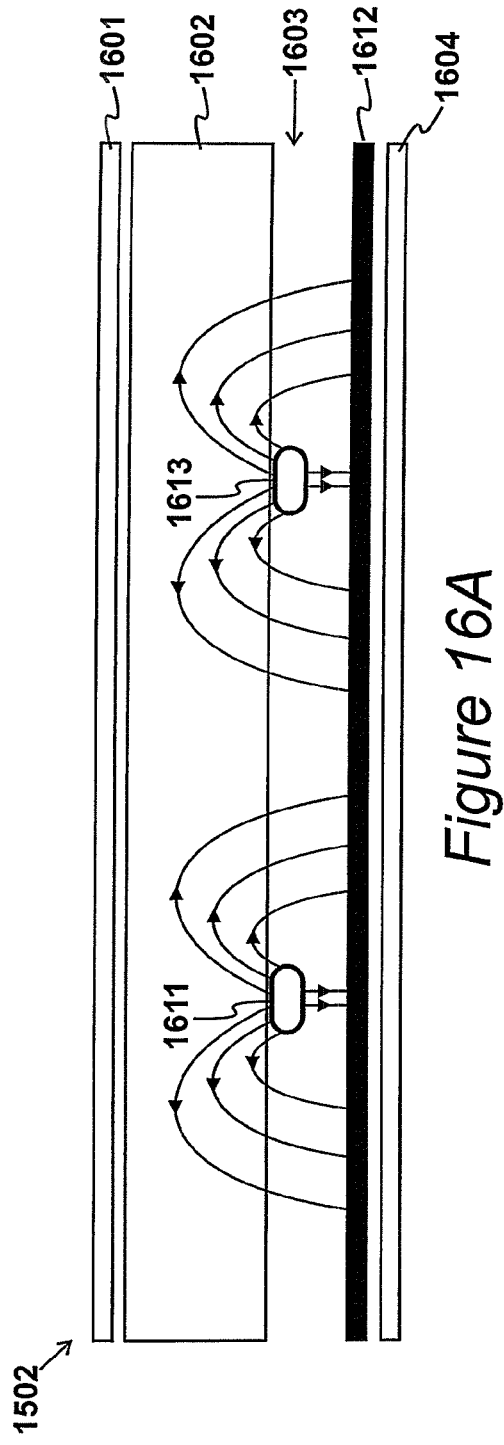
FIG. 16 shows a cross section of sensor array 1502.
Figure 16B:
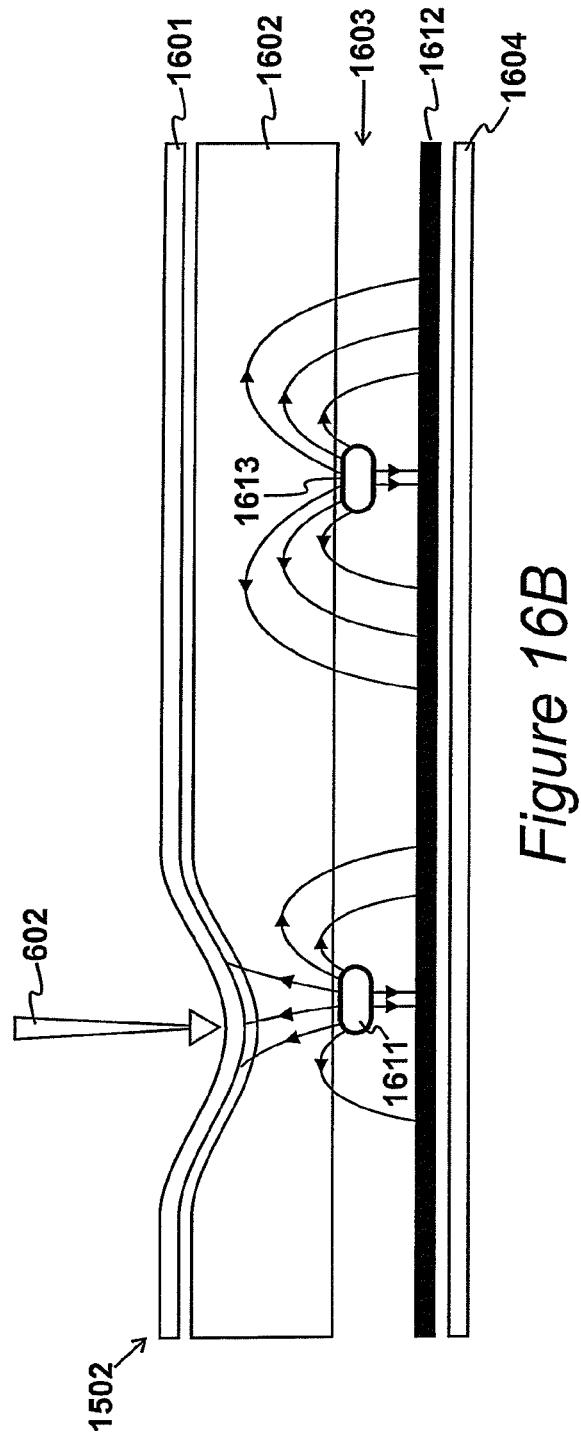

A cross section of sensor array 1502 is shown in FIG. 16. Sensor array 1502 includes an electrically grounded layer 1601, a compressible material 1602, and an electrically active layer 1603. In order to reduce the effect of stray capacitance, a second electrically grounded layer 1604 may be provided. As described previously with reference to FIG. 15, the electrically active layer comprises a plurality of transmitter electrodes arranged substantially perpendicular to a plurality of receiver electrodes. However, as FIGS. 16A and 16B show cross sections, only one receiver electrode is shown.

As shown in FIG. 16A, when an input signal is applied to a transmitter electrode, such as transmitter electrode 1611, then along with parallel-plate capacitance with a receiver electrode 1612, there will also be capacitive coupling from the side and upper surfaces of the transmitter electrode. A similar situation occurs with transmitter electrode 1613.

When a force 1605 is applied to the sensor array, the degree of capacitive coupling between transmitter electrode 1611 and receiver electrode 1612 is reduced, and so the amplitude of the signal generated on the receiver electrode is lessened.

FIG. 17

Figure 17:
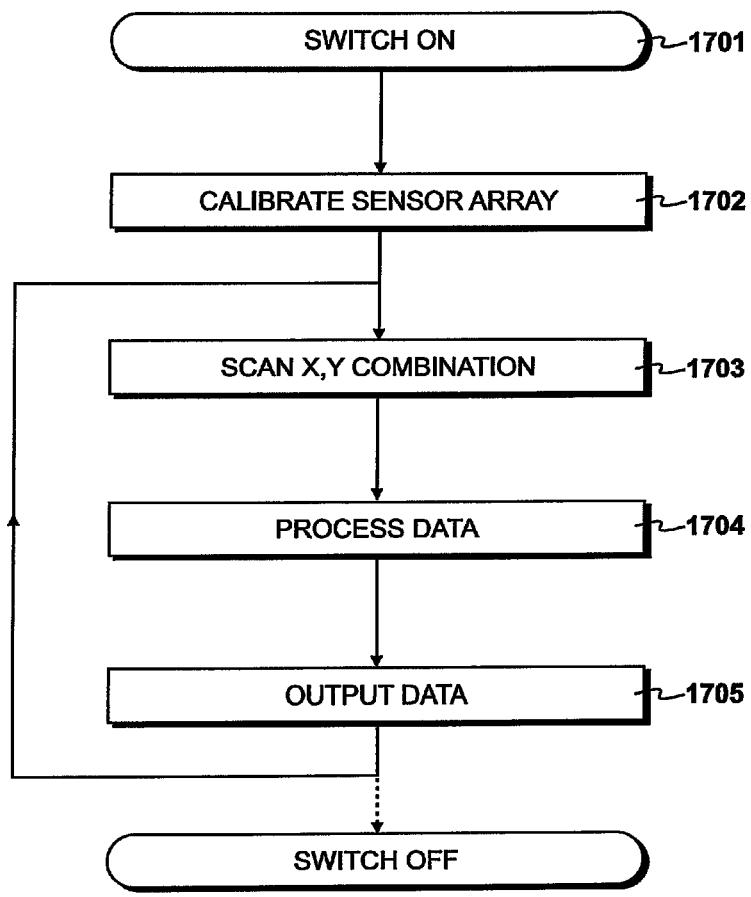
FIG. 17 details steps carried out to initialize sensor 1501.

Steps carried out to initialize sensor 1501 including sensor array 1502 are detailed in FIG. 17.

At step 1701, the sensor is switched on, and at step 1702 a calibration procedure is run. The calibration procedure is carried out with no intentional pressure applied to the sensor array, and serves to establish reference values for capacitive coupling between transmitter and receiver electrodes.

At step 1703, the sensor array is scanned by transmitting in the x-direction and receiving in the y-direction. This procedure will be described further with reference to FIG. 18. At step 1705, the duration data produced by processing device 1702 is processed, and outputted at step 1705 for further analysis. Control then returns to step 1703 where the array is scanned again, or the sensor is switched off.

FIG. 18

Figure 18:
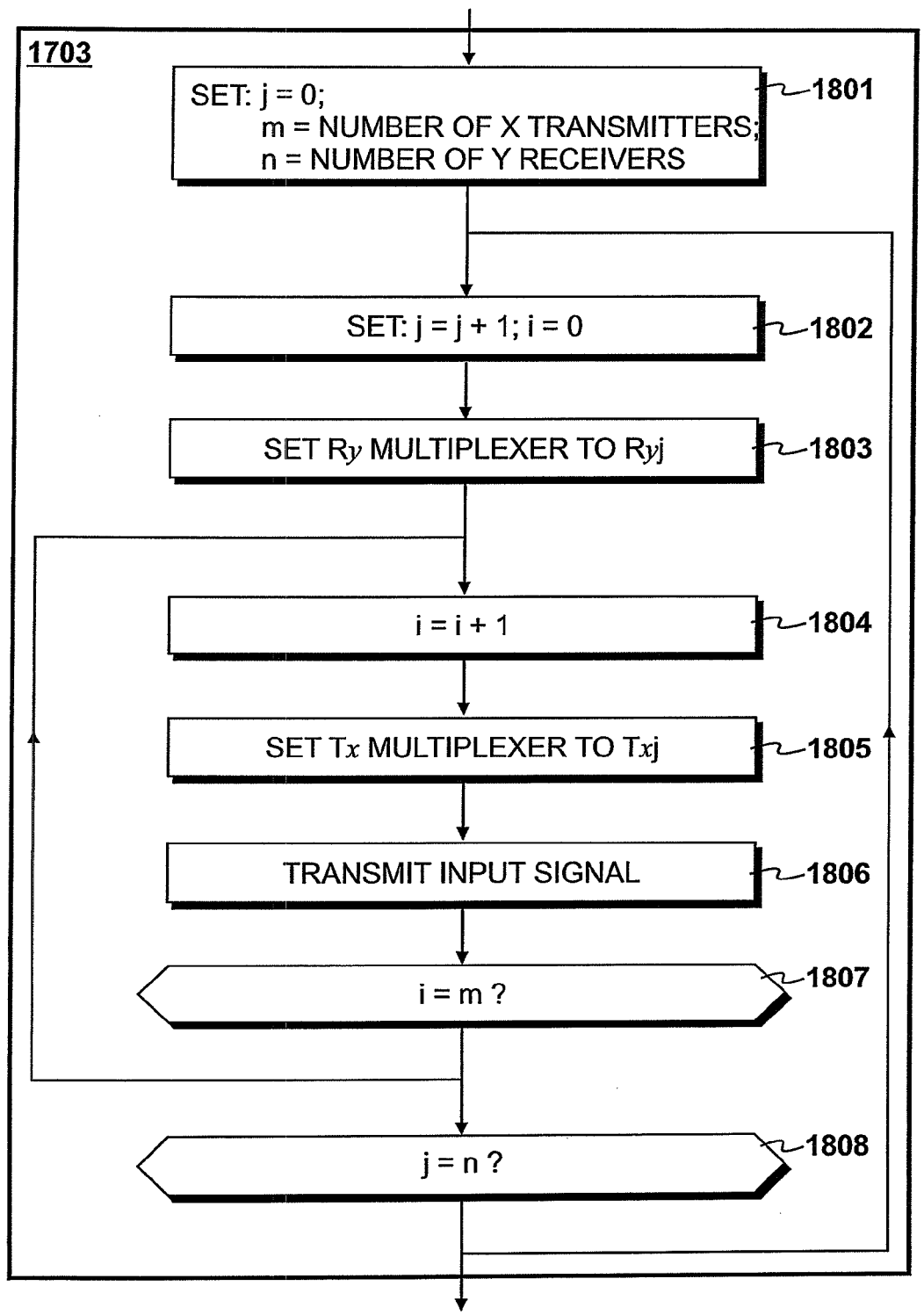
FIG. 18 details steps carried out to effect switching between the outputs of transmitter multiplexer 1506 and the inputs of receiver multiplexer 1507.

Steps carried out to effect switching between the outputs of transmitter multiplexer 1506 and the inputs of receiver multiplexer 1507 are detailed in FIG. 18.

At step 1801, the iterative variable j is set to equal 0. Constants m and n are set to be the number of transmitter electrodes and the number of receiver electrodes respectively.

At step 1802, the variable j is set to equal j+1, and an iterative variable i is set to equal zero. At step 1803, receiver multiplexer 1507 is set to receive on the jth input; so in the first case, the first input. At step 1804, the variable i is set to equal i+1, and at step 1805 transmitter multiplexer 1506 is set to output on the ith output; so in the first case, the first output. At step 1806, signal generator 1504 produces an input signal which is transmitted on the selected transmitter electrode. At step 1807, a question is asked as to whether variable i=m. If this question is answered in the negative, then control returns to step 1804 where an input signal is transmitted on the next transmitter electrode. If the question asked at step 1807 is answered in the affirmative, then a further question is asked at step 1808 as to whether the variable kn. If this question as answered in the negative, the control returns to step 1802 where j is iterated and the next receiver electrode is selected. If the questions asked at step 1808 is answered in the affirmative, then step 1703 is complete. The effect of this transmission is to effect capacitive coupling at all points where transmitter electrodes and receiver electrodes intersect, thereby creating a matrix of duration data having dimension m by n.

FIG. 19

Figure 19:
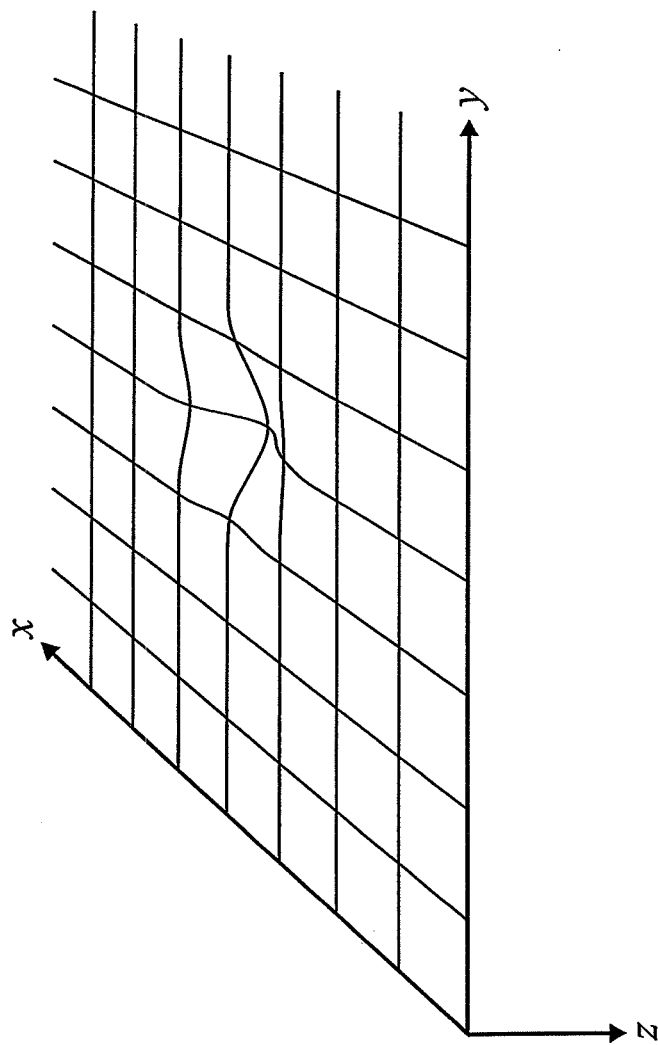
FIG. 19 shows the result of processing applied to duration data giving the magnitude and position of a force in two directions.

The result of processing applied to duration data giving the magnitude and position of a force in two directions is shown in FIG. 19.

By taking either duration data produced by sensor 1301 or sensor 1501, a three-dimensional surface map can be created. Thus, FIG. 19 illustrates the results of a polynomial interpolation on such data when a sensor is subject to a finger press, similar to that would be produced in the situation shown in FIG. 1.

The invention claimed is:

1. A sensor array for sensing the magnitude and position, in a first direction, on said sensor array of a force applied to said sensor array, which sensor array includes:
   a compressible layer,
   an electrically grounded layer, and
   an electrically active layer comprising a plurality of transmitter electrodes and a plurality of receiver electrodes; wherein:
   each one of said plurality of transmitter electrodes is configured to capacitively couple to one or more of said plurality of receiver electrodes, and
   said compressible layer is positioned between said electrically grounded layer and said electrically active layer;
   and wherein the sensor array further includes a processing device configured to:
   (I) apply a first input signal to a first one of said plurality of transmitter electrodes and detect a corresponding first output signal from a selected one of said plurality of receiver electrodes, and
   (ii) apply a second input signal to a second one of said plurality of transmitter electrodes and detect a corresponding second output signal from said selected one of said plurality of receiver electrodes.

2. The sensor array of claim 1, further comprising a second electrically grounded layer arranged to electromagnetically shield said plurality of transmitter electrodes and said plurality of receiver electrodes.

3. The sensor array of claim 1, wherein said electrically grounded layer comprises of a flexible conductive material.

4. The sensor array of claim 1, wherein said compressible layer comprises of a compressible dielectric material.

5. The sensor array of claim 1, wherein said electrically active layer comprises a membrane on to which said plurality of transmitter electrodes have been printed using conductive ink.

6. The sensor array of claim 1, wherein said processing device is configured to:
   measure said output signals to produce measurement signals;
   time said measurement signals to produce duration data; and
   interpolate said duration data to produce interpolated data.

7. The sensor array of claim 6, wherein said processing device comprises a clock and a measurement device configured to produce said measurement signal having a width in the time domain proportional to the amplitude of an output signal produced by one of said plurality of receiver electrodes, and said processing device is configured to measure time durations of said measurement signals using said clock to produce said duration data.

8. The sensor array of claim 1, wherein:
   said sensor array has an area for receiving applied forces to be sensed;
   each one of said plurality of transmitter electrodes has a linear shape extending across said area parallel to other ones of said plurality of transmitter electrodes; and
   each one of said plurality of receiver electrodes has a linear shape extending across said area parallel to other ones of said plurality of receiver electrodes.

9. The sensor array of claim 8, wherein said plurality of transmitter electrodes extend in a direction parallel to said plurality of receiver electrodes.

10. The sensor array of claim 9, wherein said electrically active layer includes a second plurality of transmitter electrodes that extend in a direction parallel to a second plurality of receiver electrodes,
    wherein said second plurality of transmitter electrodes and said second plurality of receiver electrodes are arranged orthogonally to said plurality of transmitter electrodes and said plurality of receiver electrodes, so as to allow said sensor array to sense the position of an applied force in two mutually orthogonal directions.

11. The sensor array of claim 8, wherein said plurality of transmitter electrodes extend in a direction orthogonal to said plurality of receiver electrodes.

12. A method of sensing the magnitude and position, in a first direction, of a force applied to a sensor array comprising:
    providing said sensor array, said sensor array having a compressible layer, an electrically grounded layer, and an electrically active layer, which electrically active layer comprises a plurality of transmitter electrodes and a plurality of receiver electrodes;
    applying input signals to each one of said plurality of transmitter electrodes to cause capacitive coupling between each one of said plurality of transmitter electrodes and neighboring ones of said plurality of receiver electrodes;
    detecting output signals from each one of said plurality of receiver electrodes indicative of the degree of capacitive coupling between each one of said plurality of transmitter electrode electrodes and each one of said plurality of receiver electrode electrodes;
    wherein, said input signals are applied and said output signals are detected by, for each one of said plurality of receiver electrodes performing the following steps:

(I) applying a first input signal to a first one of said plurality of transmitter electrodes and detecting a corresponding first output signal from a selected one of said plurality of receiver electrodes, and (ii) applying a second input signal to a second one of said plurality of transmitter electrodes and detecting a corresponding second output signal from said selected one of said plurality of receiver electrodes.

13. The method of claim 12, wherein:

said sensor array has an area for receiving applied forces to be sensed;

each one of said plurality of transmitter electrode electrodes has a linear shape extending across said area parallel to other ones of said plurality of transmitter electrodes; and each one of said plurality of receiver electrode electrodes has a linear shape extending across said area parallel to other ones of said plurality of receiver electrodes; and each said plurality of transmitter electrode electrodes extend extends in a direction parallel to said plurality of receiver electrodes.

14. The method of claim 13, wherein said input signals are produced at a frequency of repetition of 2f, and said input signals are applied to each one of said plurality electrodes in sequence by multiplexing at a frequency f.

15. The method of claim 13, wherein said output signals are detected from each one of said plurality of receiver electrodes in sequence by switching between said plurality of receiver electrodes in sequence at a frequency f and 180 degrees out of phase with the multiplexing of said input signals.

16. The method of claim 12, wherein:

said sensor array has an area for receiving applied forces to be sensed;

each one of said plurality of transmitter electrode electrodes has a linear shape extending across said area parallel to other ones of said plurality of transmitter electrodes; and each one of said plurality of receiver electrode electrodes has a linear shape extending across said area parallel to other ones of said plurality of receiver electrodes; and said plurality of transmitter electrodes extend in a direction orthogonal to said plurality of receiver electrodes.

17. The method of claim 16, wherein said input signals are produced at a frequency of repetition of (n×f), and said input signals are applied to each one of said plurality of transmitter electrodes in sequence by multiplexing at a frequency (n×f), where n is the number of transmitter electrodes in the sensors array.

18. The method of claim 17, wherein said output signals are detected from each one of said plurality of receiver electrodes in sequence by switching between said plurality of receiver electrodes in sequence at a frequency f.

* * * * *